(12) United States Patent
Yin et al.

(10) Patent No.: US 10,796,849 B2
(45) Date of Patent: *Oct. 6, 2020

(54) MAGNETICALLY TUNABLE PHOTONIC CRYSTALS BASED ON ANISOTROPIC NANOSTRUCTURES

(71) Applicant: THE REGENTS OF THE UNIVERSITY OF CALIFORNIA, Oakland, CA (US)

(72) Inventors: Yadong Yin, Riverside, CA (US); Mingsheng Wang, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 358 days.

This patent is subject to a terminal disclaimer.

(21) Appl. No.: 15/569,912

(22) PCT Filed: Apr. 27, 2016

(86) PCT No.: PCT/US2016/029461
§ 371 (c)(1),
(2) Date: Oct. 27, 2017

(87) PCT Pub. No.: WO2016/176267
PCT Pub. Date: Nov. 3, 2016

(65) Prior Publication Data
US 2018/0114637 A1    Apr. 26, 2018

Related U.S. Application Data

(60) Provisional application No. 62/153,228, filed on Apr. 27, 2015.

(51) Int. Cl.
| | | |
|---|---|---|
| H01F 41/02 | (2006.01) | |
| C01G 49/02 | (2006.01) | |
| H01F 1/00 | (2006.01) | |
| B22F 1/00 | (2006.01) | |
| B82Y 20/00 | (2011.01) | |
| B82Y 25/00 | (2011.01) | |
| B82Y 40/00 | (2011.01) | |

(52) U.S. Cl.
CPC ............ *H01F 41/02* (2013.01); *C01G 49/02* (2013.01); *H01F 1/0036* (2013.01); *B22F 1/0025* (2013.01); *B22F 2001/0033* (2013.01); *B22F 2998/10* (2013.01); *B22F 2999/00* (2013.01); *B82Y 20/00* (2013.01); *B82Y 25/00* (2013.01); *B82Y 40/00* (2013.01); *C01P 2004/04* (2013.01); *C01P 2004/16* (2013.01); *C01P 2004/84* (2013.01); *Y10S 977/762* (2013.01); *Y10S 977/81* (2013.01); *Y10S 977/892* (2013.01); *Y10S 977/896* (2013.01); *Y10S 977/952* (2013.01)

(58) Field of Classification Search
CPC ....... B82Y 20/00; C01G 49/02; H01F 1/0036; B22F 1/0022; B22F 1/0025; B22F 1/0018; B22F 1/0044; B22F 1/0062; B22F 1/02; B22F 2001/0037
See application file for complete search history.

(56) References Cited

U.S. PATENT DOCUMENTS

| | | | |
|---|---|---|---|
| 4,096,292 A * | 6/1978 | Fagherazzi ............ | C01G 49/06 252/62.56 |
| 10,359,678 B2 * | 7/2019 | Yin ........................ | C09K 19/54 |
| 2010/0224823 A1 | 9/2010 | Yin et al. | |
| 2012/0028834 A1 | 2/2012 | Kwon et al. | |
| 2012/0061609 A1 | 3/2012 | Yin et al. | |
| 2012/0326104 A1 | 12/2012 | Kwon et al. | |
| 2013/0105581 A1 | 5/2013 | Kwon et al. | |
| 2013/0251624 A1 | 9/2013 | Yu | |
| 2013/0330280 A1 | 12/2013 | Perez et al. | |
| 2014/0243189 A1 | 8/2014 | Yin et al. | |
| 2014/0360973 A1 | 12/2014 | Yin et al. | |

FOREIGN PATENT DOCUMENTS

| | | |
|---|---|---|
| CN | 1472024 A | 2/2004 |
| CN | 102199302 A | 9/2011 |
| CN | 102628188 A | 8/2012 |
| CN | 103123836 A | 5/2013 |
| RU | 2 414 417 C2 | 3/2011 |

OTHER PUBLICATIONS

First Office Action dated Apr. 29, 2019, by the National Intellectual Property Administration, P.R. China, in corresponding Chinese Patent Application No. 201680037841.7, and an English translation of the Office Action.
Extended European Search Report dated Oct. 18, 2018 in European Patent Application No. 16787025.2.
Thorkelsson et al., "Self-assembly and applications of anisotropic nanomaterials: A view", Nano Today, vol. 10, No. 1, Feb. 1, 2015, pp. 48-66.
International Search Report (PCT/ISA/210) dated Jul. 27, 2016, by the Japanese Patent Office as the International Searching Authority for International Application No. PCT/US2016/029461.
Written Opinion (PCT/ISA/237) dated Jul. 27, 2016, by the Japanese Patent Office as the International Searching Authority for International Application No. PCT/US2016/029461.

(Continued)

*Primary Examiner* — C Melissa Koslow
(74) *Attorney, Agent, or Firm* — Buchanan Ingersoll & Rooney PC

(57) ABSTRACT

A method is disclosed of forming magnetically tunable photonic crystals comprising: synthesizing one or more precursory nanoparticles with anisotropic shapes; coating the one or more anisotropic precursory nanoparticles with silica to form composite structures; converting the one or more anisotropic precursory nanoparticles into magnetic nanomaterials through chemical reactions; and assembling the anisotropic magnetic nanoparticles into photonic crystals in a solvent.

9 Claims, 2 Drawing Sheets

(56) References Cited

OTHER PUBLICATIONS

Second Office Action dated Jan. 20, 2020, by the National Intellectual Property Administration, P.R. China in corresponding Chinese Patent Application No. 201680037841.7, with an English translation of the Office Action. (28 pages).
Ge et al., "Magnetochromatic Microspheres: Rotating Photonic Crystals," Journal of the American Chemical Society, (Jun. 15, 2009), vol. 131, Issue 43, pp. 15687-15694.
Wang et al., "Magnetic Assembly and Field-Tuning of Ellipsoidal-Nanoparticle-Based Colloidal Photonic Crystals," Angewandte Chemie International Edition, (Apr. 29, 2015), vol. 54, Issue 24, pp. 7077-7081.
Zhang et al., "Highly Shape-Selective Synthesis, Silica Coating, Self-Assembly, and Magnetic Hydrogen Sensing of Hematite Nanoparticles," Langmuir, (Dec. 14, 2009), vol. 26, Issue 7, pp. 5273-5278.
Office Action dated Mar. 2, 2020, by the Japanese Patent Office in corresponding Japanese Patent Application No. 2017-556563 and an English Translation of the Office Action. (19 pages).
Office Action (Notification to Grant Patent Right for Invention) dated May 22, 2020, by the National Intellectual Property Administration, P. R. China in corresponding Chinese Patent Application No. 201680037841.7 and an English Translation of the Office Action. (5 pages).

* cited by examiner

MAGNETICALLY TUNABLE PHOTONIC CRYSTALS BASED ON ANISOTROPIC NANOSTRUCTURES

TECHNICAL FIELD

The present invention relates to a method of forming magnetically tunable photonic crystals based on anisotropic nanostructures.

BACKGROUND

Colloidal assembly has been widely explored to produce artificial structure color by manipulating the light interaction with physical periodic structures. Easily found in nature such as opals, bird feathers and butterfly scales, structure color is brilliantly iridescent, metallic, and free from photobleaching unlike conventional pigments or dyes. Most colloidal assembly processes mimic the formation of opals and create close-packed structures from monodisperse colloidal spheres. However, living systems often involve non-close-packed ordered assemblies of anisotropic motifs such as plates and rods, thus display significantly more complex structural color responses including strong angular dependence and polarization effect. As the employment of anisotropic building blocks in colloidal assembly is expected to potentially produce photonic structures, efforts have been made to organizing elongated particles such as polystyrene and ZnS, albeit the assembly methods are rather conventional and the resulting crystals are near close-packed and do not exhibit unique photonic responses than those from spherical particles.

One of the important advantages of anisotropic particles is that they often possess shape-dependent physical and chemical properties, which can add more degrees of freedom for manipulating the collective properties of the resultant superstructures. This can be of particular interest to the fabrication of field-responsive colloidal photonic structures, in which static or dynamic structural changes are usually accompanied by switching of photonic properties. Efforts along this direction, however, have been very limited, mostly due to the unavailability of high quality anisotropic building blocks and the lack of effective mechanism for assembly and tuning.

SUMMARY (1) A method is disclosed of forming magnetically tunable photonic crystals comprising: synthesizing one or more precursory nanoparticles with anisotropic shapes; coating the one or more anisotropic precursory nanoparticles with silica to form composite structures; converting the one or more anisotropic precursory nanoparticles into magnetic nanomaterials through chemical reactions; and assembling the anisotropic magnetic nanoparticles into photonic crystals in a solvent.

(2) In accordance with an exemplary embodiment, the one or more anisotropic precursory nanoparticles are iron oxyhydroxide (FeOOH) nanorods.

(3) In accordance with an aspect of the method of (1), the one or more anisotropic precursory nanoparticles are iron hydroxide, cobalt hydroxide/oxyhydroxide, nickel hydroxide/oxyhydroxide, and/or other transition metal hydroxide/oxyhydroxide nanorods.

(4) In accordance with an aspect of the method of (1), the one or more anisotropic precursory nanoparticles are transition metal oxides, chlorides, sulfides, carbonates, and/or nitrates.

(5) In accordance with an aspect of the method of (1), wherein the one or more anisotropic precursory nanoparticles are rods, wires, plates, disks, ellipsoids, oblate spheroids, cubes, tetrahedra, octahedral, and/or rhombohedra.

(6) In accordance with an aspect of the method of (1), comprising: adding tetraethyl orthosilicate into a mixture of distilled water, ethanol, ammonia and anisotropic precursory nanoparticles; and isolating the coated composite structures from by centrifugation.

(7) In accordance with an aspect of the method of (1), comprising: heating the coated composite structures; and reducing the coated composite structures with reducing agents to rend the coated composited structures magnetic.

(8) In accordance with an aspect of the method of (1), comprising: redispersing the as-reduced magnetic particles by sonication; applying a size selection to the particles; and discarding non-dispersible aggregates by centrifugation.

(9) In accordance with an aspect of the method of (1), comprising: a solvent for assembling nanoparticles into photonic structures, the solvent being water, ethanol, glycol, and other polar or nonpolar solvents.

(10) In accordance with an aspect of the method of (2), wherein the step of synthesizing the iron oxyhydroxide nanorods comprises: solution-based synthesis of anisotropic precursory nanoparticles; and solution-free synthesis of anisotropic precursory nanoparticles.

(11) In accordance with an aspect of the method of (10), comprising: dissolving iron salts in deionized water; adjusting the concentration of iron cations; discarding undissolved precipitates; and heating the supernatant.

(12) In accordance with an aspect of the method of (10), comprising: calcinating iron salts under elevated temperatures.

(13) In accordance with an aspect of the method of (10), comprising: isolating the iron oxyhydroxide nanorods by centrifugation.

(14) In accordance with an aspect of the method of (10), comprising: functionalizing the surface of iron oxyhydroxide nanorods with surfactants.

(15) In accordance with an aspect of the method of (11), wherein the iron comprises: iron chloride, iron nitride, iron sulfate, and/or other solvable iron compounds.

(16) In accordance with an aspect of the method of (11), wherein the heating temperature of the supernatant comprises: temperature ranging from room temperature to 2000° C.

(17) In accordance with an aspect of the method of (14), wherein the surfactants comprises: ionic surfactants; and non-ionic surfactants.

(18) In accordance with an aspect of the method of (17), wherein the ionic surfactants comprises: poly(acrylic acid), or cetyltrimethylammonium bromide.

(19) In accordance with an aspect of the method of (17), wherein the ionic surfactants comprises: polyvinylpyrrolidone.

(20) In accordance with an aspect of the method of (19), wherein the iron comprises: iron chloride, iron nitride, iron sulfate, and/or other solvable iron compounds.

DETAILED DESCRIPTION

Figure 1:
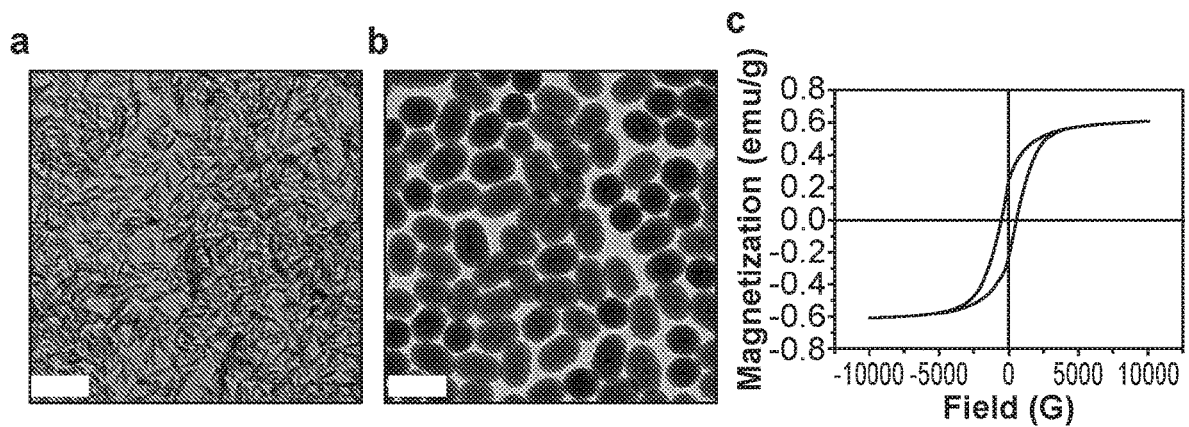
FIGS. 1(a)-1(c) show (a) TEM image of typical FeOOH nanorods; (b) TEM image of magnetic nanoellipsoids obtained by coating these FeOOH nanorods with silica and then reducing them in $H_2$; and (c) the corresponding magnetic hysteresis loops of the nanoellipsoids. Scale bars: 200 nm.

In accordance with an exemplary embodiment, an assembly is disclosed, which benefits from a unique synthesis towards highly uniform anisotropic colloidal ellipsoids. As uniform magnetic ellipsoids are not directly available, an indirect approach by first synthesizing uniform iron oxyhydroxide (FeOOH) nanorods (FIG. 1(a)) was taken, then coating them with silica to form composite ellipsoids, and finally converting the FeOOH into magnetic metallic iron through reduction.

In accordance with an exemplary embodiment, the silica coating can play multiple important roles here. First, the silica coating increases the dimension of FeOOH nanorods to the size range suitable for creating photonic responses in the visible spectrum. Second, the silica coating provides a protection mechanism that prevents the disintegration of the nanorods during reduction. The conversion from FeOOH to Fe involves dehydration and reduction reactions, both of which induce significant morphological changes. As indicated in the FIG. 1(b), the nanorods mostly shrank and disintegrated into small pieces after reduction. The overall rod shape however was well retained thanks to the ellipsoidal space created within the silica shells. Finally, the silica layer acts as a spacer that separates the magnetic nanorods by certain distance and limits their magnetic attraction, therefore preventing their colloidal dispersion from aggregation despite the ferromagnetic nature of the nanorods.

Figure 2:
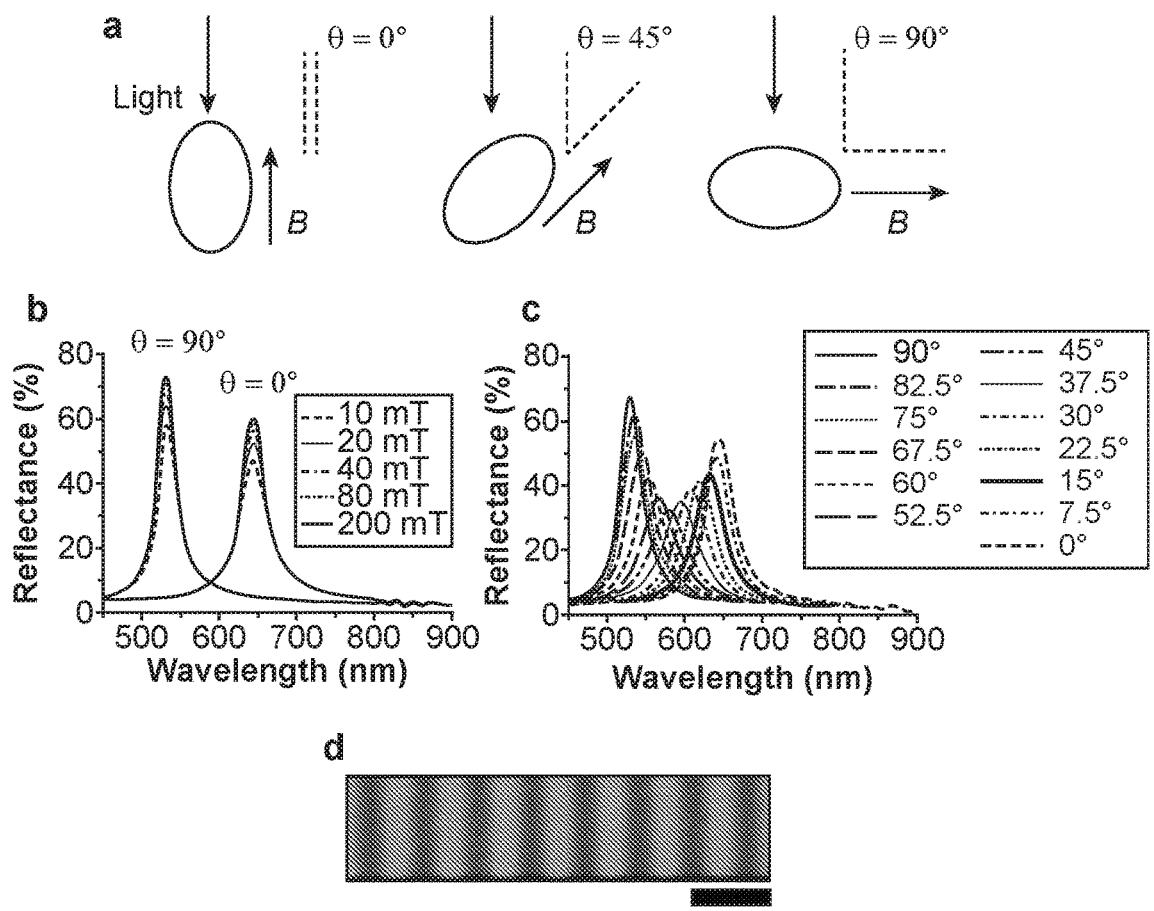
FIGS. 2(a)-2(d) show (a) scheme for the spontaneous alignment of nanoellipsoids under magnetic fields; (b) reflection spectra of photonic structures under perpendicular and parallel magnetic fields with varying strengths; (c) reflection spectra of photonic structures under magnetic fields with varying directions with respect to the direction of light; and (d) digital photo showing the photonic response of nanoellipsoids encapsulated in a flat glass tube under a nonideal linear Halbach array. Scale bar: 5 mm.

Compared with spherical building blocks, a unique feature of the anisotropic nanoellipsoids is that their assemblies show strong dependence of photonic response on the field direction. In addition to the positional order that is usually considered for describing assemblies from spherical building blocks, one should take orientational order into account when nanoellipsoids are assembled. Owing to the anisotropic magnetic cores embedded within, the orientation of nanoellipsoids can be easily controlled by external magnetic fields. Upon the application of magnetic fields, nanoellipsoids rotate and align their long axis parallel to the field direction, as schematically shown in FIG. 2(a). Such rotation not only gives rise to changes in orientational orders, but also affects positional orders and subsequently photonic properties of the assemblies. In the meantime, the field strength is also believed to play an important role in the perfection of ordering since it determines to what degree the nanoellipsoids can align.

In order to investigate the effect of field strength and direction, the photonic property of structures assembled from nanoellipsoids was examined, under magnetic fields with varying strengths and directions. Aqueous dispersions of nanoellipsoids were concentrated to a desired volume fraction to allow their spontaneous ordering into colloidal crystals. FIG. 2(b) shows the reflection spectra of photonic structures under magnetic fields parallel and perpendicular to the direction of incident light. A magnetic field perpendicular to the light aligns nanoellipsoids to the perpendicular orientation as well so that the interplanar spacing is mainly determined by the short axis of nanoellipsoids, resulting in a reflection peak at shorter wavelength. When the field direction is switched to be parallel to the light, the interplanar spacing is determined by the long axis of nanoellipsoids, accounting for a reflection peak at longer wavelength. The field strength, on the other hand, is found to influence the intensity of reflectance rather than the wavelength, for both samples. The increased reflectance intensity is believed to result from the better orientational order of the nanoellipsoids under stronger fields: because of the limited amount of magnetic species embedded inside them, the rotation of nanoellipsoids requires a sufficiently high magnetic field to allow the magnetic torque to overcome the rotational resistance. When the field direction is fixed, varying the field strength does not alter the reflection wavelength. The contribution of the magnetic interactions between nanoellipsoids to the interplanar spacing of the assemblies seems to be negligible, mainly owing to the effective separation of the magnetic nanorods by relatively thick silica coating.

Different from conventional colloidal crystals assembled using spherical particles where tuning of photonic property can only be achieved by controlling the interplanar spacing through variation in field strength, tuning field direction results in simultaneous rotation of nanoellipsoids, which further leads to changes in the interplanar spacing of the assemblies as well as their photonic properties. In accordance with an exemplary embodiment, the photonic property of structures assembled from nanoellipsoids were investigated under a rotating magnetic field. As shown in FIG. 2(c), the wavelength of reflectance peak reaches a minimum value when the field direction is perpendicular to the incident light, and gradually red shifts as the field switches from perpendicular to parallel to the incident light. Such shift in reflection wavelengths responds to the change of field direction immediately (within less than a second) and is fully reversible. A notable feature of such magnetic tuning is that the maximum intensity is achieved at the two end points when the magnetic fields are either parallel or perpendicular to the incident light. When the field direction is switched away from these two end points, the relative intensity decreases and reaches a minimum at the middle point (~45° from the parallel and perpendicular directions), resulting in an overall U-shaped profile of reflectance peaks. This is a major difference when compared to the previous reported one-dimensional photonic chains where the strongest reflectance is only achievable under intermediate field intensity and the profile of reflectance peaks is an inverted U curve.

The orientational dependence of the nanoellipsoidal assemblies can find direct use in creating photonic patterns under magnetic fields with inuniform field directions. As demonstrated in FIG. 2(d), when subjected to complex magnetic field produced by a nonideal linear Halbach array, which has a spatially rotating pattern of magnetization, a dispersion of nanoellipsoids encapsulated in a flat glass tube exhibits a colorful pattern containing blue and green stripes.

In addition to orientation, the interplanar spacing of the photonic assemblies is also determined by the volume fractions of the nanoellipsoids. As the volume fraction decreases, the distance between nanoellipsoids increases, resulting in the expansion of crystal lattice as well as red-shift of reflection wavelength. In the absence of magnetic fields, the reflection spectra of photonic assemblies under different volume fractions were recorded and then exhibited in FIG. 3(a). The reflection peak shifted from 425 nm to 660 nm, as the volume fractions decreased from 32% to 10%. Consistently, a rainbow-like color effect was observed in FIG. 3(b) in the dispersion of nanoellipsoids with a volume fraction gradient, which was achieved by centrifugation at 3000 rpm for 5 min.

Figure 3:
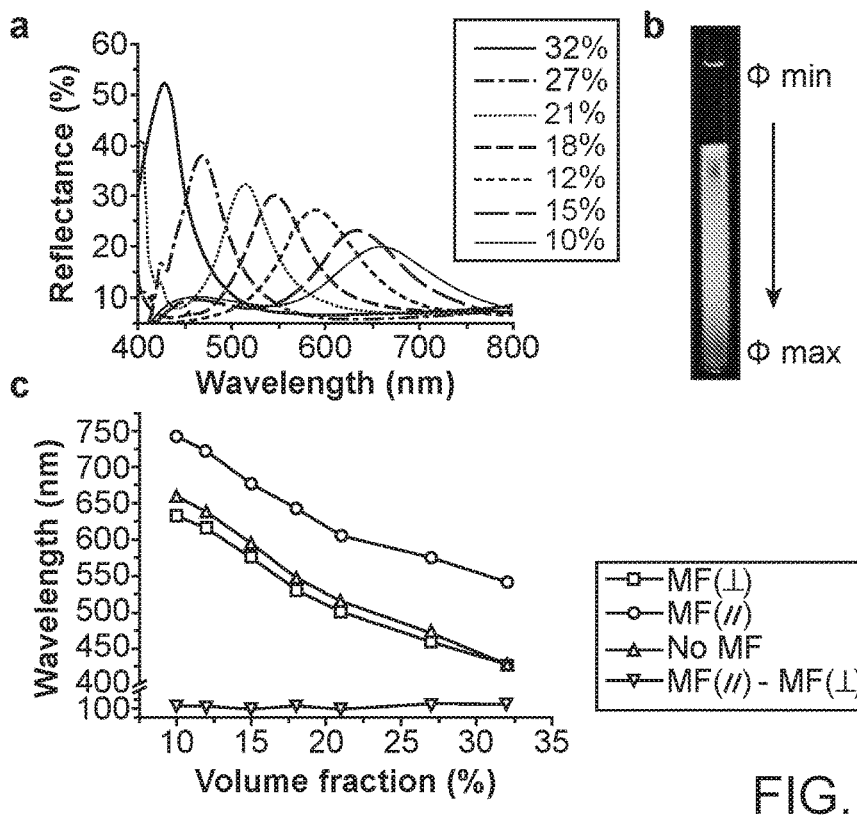
FIGS. 3(a)-3(c) show (a) reflection spectra of the colloidal dispersion of the nanoellipsoids under different volume fractions in the absence of magnetic fields; (b) digital image of the dispersion of the nanoellipsoids in a glass capillary tube with a volume fraction gradient; and (c) dependence of reflection wavelength of photonic structures on the volume fraction of the nanoellipsoids, in the presence or absence of magnetic fields.
Figure 4:
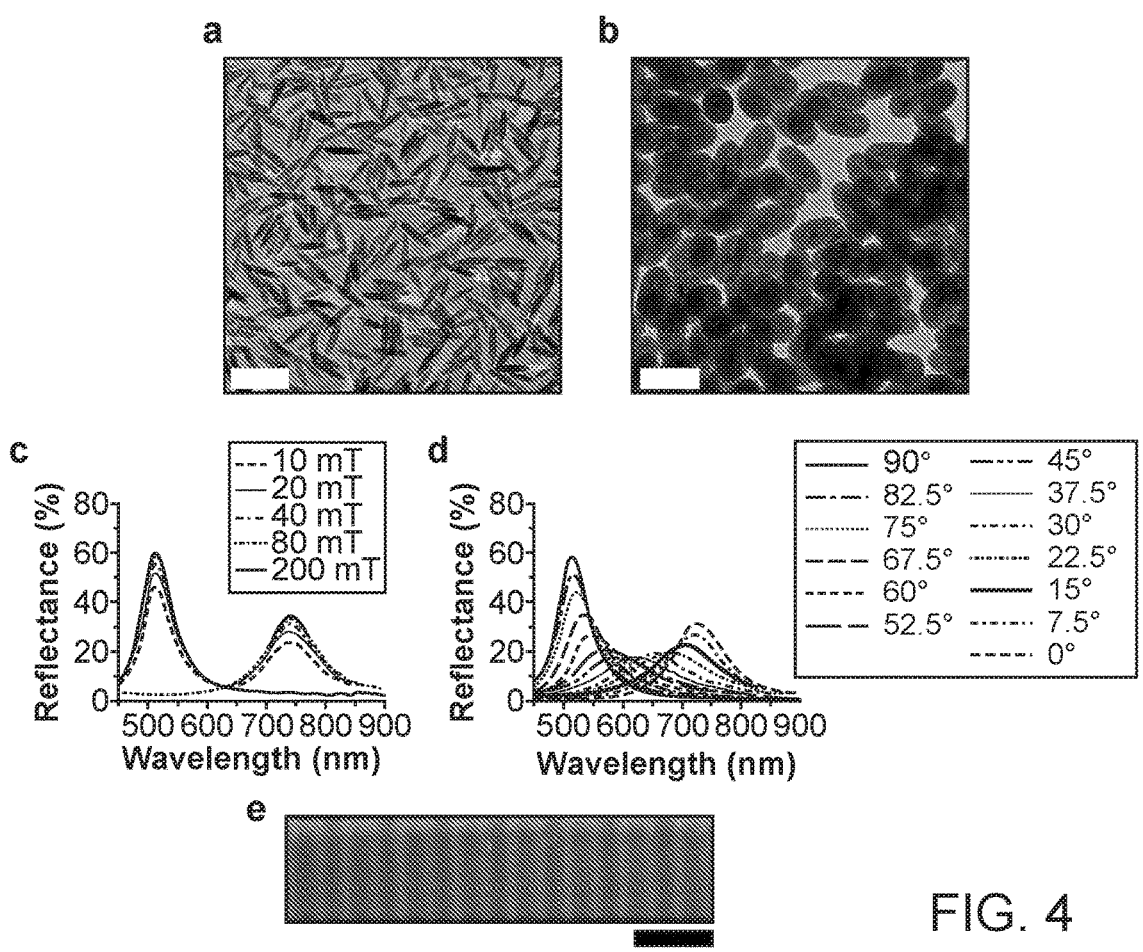
FIGS. 4(a)-4(e) show (a) TEM image of typical FeOOH nanorods; (b) TEM image of magnetic nanoellipsoids obtained by coating these FeOOH nanorods with silica and then reducing them in $H_2$; Scale bar: 200 nm; (c) reflection spectra of photonic structures under perpendicular and parallel magnetic fields with varying strengths; (d) reflection spectra of photonic structures under magnetic fields with varying directions with respect to the direction of light; and (e) Digital photo showing the photonic response of nanoellipsoids encapsulated in a flat glass tube under a nonideal linear Halbach array. (Scale bar: 5 mm).

The synergy of both field directions and volume fractions allows for a wide range of tuning of the optical property of photonic assemblies. FIG. 3(c) plots the changes in peak positions with volume fraction of the solution under parallel or perpendicular magnetic fields or no field. Interestingly, for each volume fraction, the difference in the peak position of the photonic assemblies under parallel and perpendicular magnetic fields remains constantly at around 105 nm, as represented by the black dashed line. Such difference in peak positions is attributed to the difference in the long axis and the short axis of nanoellipsoids, and therefore is not subjected to change with the volume fractions. In the absence of magnetic fields, the orientation of nanoellipsoids is less uniform. The interplanar spacings of the assemblies and the positions of reflection peaks are thus always between those under parallel magnetic fields and under perpendicular magnetic fields. Without the presence of external field, the nanoellipsoids tend to align themselves along the surface of sample container, which is perpendicular to the incident angle so that the reflection peak is close to that of the case in a perpendicular magnetic field even at a relatively low volume fraction (FIG. 3(c)). As the volume fraction increases, the orientational order of nanoellipsoids in the absence of magnetic fields enhances and eventually becomes nearly the same as the case aligned by magnetic field, as confirmed by the coincidence of the peak positions at a high volume fraction of ~32%. The enhanced orientational order can be explained by the reduced excluded volume of each nanoellipsoid at a higher volume fraction. The nanoellipsoids decreased orientational entropy but increased translational entropy to reach an energetically favorable structure, in which most of nanoellipsoids align parallel.

In accordance with an exemplary embodiment, a new class of magnetically responsive photonic crystals are disclosed whose diffraction property can be widely tuned by controlling the field direction. In contrast to the conventional colloidal crystals made from spherical particles where dynamic tuning of photonic property is mainly achieved by controlling the field strength, the novel colloidal crystals assembled from highly uniform shape- and magnetically anisotropic nanoellipsoids diffract at a minimum wavelength when the field direction is perpendicular to the incident angle and a maximum wavelength when the field is switched to parallel. The diffraction intensity reaches maximum values when the field is either parallel or perpendicular to the incident light, and decreases when the field direction is switched off-angle, displaying a unique U-shaped profile in reflectance peaks. The shift in diffraction in response to the change in field direction is instantaneous and fully reversible. The current system not only allows more opportunities in studying the assembly behavior of shape- and magnetically anisotropic nanostructures but also provides a new platform for building novel active optical components for various color presentation and display applications.

In this process, the starting materials are not limited to FeOOH nanorods, and can be extended to other metal hydroxides, for example, $Co(OH)_2$, $Ni(OH)_2$ and $Fe(OH)_3$. The morphology of nanoparticles is not limited to ellipsoid, and can be extended to rods, plates, oblate spheroid, et al. The solvent for assembling nanoparticles into photonic structures can be but not limited to water, ethanol, glycol, and other polar or nonpolar solvents. A typical route for making nanoellipsoids-based photonic structures is listed below:

EXAMPLE 1

Synthesis of FeOOH Nanorods

In accordance with an exemplary embodiment, the process started with the synthesis of FeOOH nanorods. In a typical synthesis of 70 nm FeOOH nanorods, $FeCl_3.6H_2O$ was dissolved in 40 mL of deionized water and the concentration of $Fe^{3+}$ was adjusted to 0.02 M. The undissolved precipitates were discarded after centrifugation at 11000 rpm for 3 minutes. The supernatant was added to a three-neck flask and heated at 81° C. under magnetic stirring for 12 hrs. The particles were then isolated by centrifugation, washed with water for several times, and dispersed in 7.2 mL of water.

Surface Modification of FeOOH Nanorods

The surfaces of as-synthesized FeOOH nanorods were functionalized with polyacrylic acid (PAA) at first. Typically, 3 mL of the above FeOOH dispersions and 1 mL of PAA solution (7.2 mg/mL) was added into 16 mL of water under sonication. The mixture was then stirred for 12 hours to allow the PAA functionalization of nanorods. Afterwards, the excess PAA in the solution was removed by centrifugation, and the FeOOH nanorods were redispersed in 3 mL of water.

Synthesis of FeOOH@$SiO_2$ Nanoellipsoids

A 3 mL aqueous dispersion of PAA-modified FeOOH was added into 20 mL of isopropanol, followed by the addition of 1 mL of ammonium hydroxide (~28% wt). For the silica coating of 70 nm FeOOH nanorods, 400 μL of tetraethyl orthosilicate (TEOS) was added into the above mixture in every 30 minutes until the total amount of TEOS reached 2.4 mL. After an additional 1 hour of reaction, the FeOOH@$SiO_2$ nanoellipsoids were isolated by centrifugation, washed with ethanol and water for several times, and dispersed in ethanol.

Reduction of FeOOH@$SiO_2$ Nanoellipsoids

The FeOOH@$SiO_2$ nanoellipsoids was heated to 500° C. under $N_2$ protection, and then reduced at this temperature for 2 hours by pure $H_2$ to produce the Fe@$SiO_2$ nanoellipsoids.

Assembly of Nanoellipsoids Into Photonic Structures

The as-reduced nanoellipsoids were redispersed in water by sonication for 30 minutes The dispersion was added to a three-neck flask and refluxed at 100° C. for 2 hours. The nanoellipsoids were isolated by centrifugation and washed by water for several times. Size selection was then applied and non-dispersible aggregates were discarded by centrifugation at 2000 rpm for 2 minutes. The dispersions of nanoellipsoids were first concentrated to the maximum volume fraction beyond which aggregations will form, and a certain amount of water was then added into the dispersions to produce the desired concentration.

EXAMPLE 2

Nanoellipsoids with higher aspect ratio can also be synthesized. In a typical synthesis of 110 nm FeOOH nanorods, $FeCl_3.6H_2O$ was dissolved in 40 mL of deionized water and the concentration of $Fe^{3+}$ was adjusted to 0.1 M. 1 g of CTAB was added into the solution. The undissolved precipitates were discarded after centrifugation at 11000 rpm for 3 minutes. The supernatant was added to a three-neck flask and heated at 90° C. under magnetic stirring for 18 hours. The particles were then isolated by centrifugation, washed with water for several times, and dispersed in 36 mL of water.

The as-synthesized FeOOH nanorods were modified with PAA by the similar procedure. For the silica coating, 200 μL of TEOS was added into the above mixture in every 30 minutes until the total amount of TEOS reached 1.2 mL. After an additional 1 hour of reaction, the FeOOH@SiO$_2$ nanoellipsoids were isolated by centrifugation, washed with ethanol and water for several times, and dispersed in ethanol. Then similar to the above process, the nanoellipsoids were reduced by $H_2$, redispersed in water, and assembled into photonic structures. The as-assembled photonic structures also show angular-dependence property, and exhibit rainbow-like patterns when they are placed on a nonideal linear Halbach array.

The invention is not limited, however, to the embodiments and variations described above and illustrated in the drawing figures. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A method of forming magnetically tunable photonic crystals comprising:
    synthesizing precursory nanoparticles with anisotropic shapes, the anisotropic precursory nanoparticles being iron oxyhydroxide (FeOOH) nanorods;
    coating the anisotropic precursory nanoparticles with silica to form composite structures;
    converting the anisotropic precursory nanoparticles into magnetic nanomaterials through chemical reactions, the chemical reactions including reducing the coated composite structure with reducing agents to render the coated composite structures magnetic; and
    assembling the anisotropic magnetic nanoparticles into photonic crystals in a solvent.

2. The method of claim 1, comprising:
    adding tetraethyl orthosilicate into a mixture of distilled water, ethanol, ammonia and anisotropic precursory nanoparticles; and
    isolating the coated composite structures by centrifugation.

3. The method of claim 1, wherein the reducing of the coated composite structure with reducing agents to render the coated composite structures magnetic comprises:
    heating the coated composite structures; and
    reducing the coated composite structures with the reducing agents to render the coated composite structures magnetic.

4. The method of claim 1, further comprising:
    redispersing the as-reduced magnetic nanoparticles by sonication;
    applying a size selection to the magnetic nanoparticles; and
    discarding non-dispersible aggregates by centrifugation.

5. The method of claim 1, comprising:
    a solvent for assembling nanoparticles into photonic structures, the solvent being water, ethanol, glycol, and other polar or nonpolar solvents.

6. The method of claim 1, wherein the synthesizing of the iron oxyhydroxide nanorods comprises:
    solution-based synthesis of anisotropic precursory nanoparticles.

7. The method of claim 6, further comprising:
    dissolving iron trichloride in deionized water;
    adjusting a concentration of iron cations in the iron trichloride dissolved in the deionized water;
    discarding undissolved precipitates after centrifugation from the iron trichloride dissolved in the deionized water to form a supernatant; and
    heating the supernatant to form the iron oxyhydroxide nanorods.

8. The method of claim 7, comprising:
    isolating the iron oxyhydroxide nanorods by centrifugation.

9. The method of claim 7, comprising:
    functionalizing a surface of the iron oxyhydroxide nanorods with polyacrylic acid.

* * * * *